Sept. 8, 1931.  K. FASSNACHT ET AL  1,822,393

FLEXIBLE CHAIN

Filed Sept. 19, 1929

INVENTOR.
Karl Fassnacht
Richard Gloss
Barlow & Barlow
ATTORNEYS.

Patented Sept. 8, 1931

1,822,393

UNITED STATES PATENT OFFICE

KARL FASSNACHT AND RICHARD GLOSS, OF PROVIDENCE, RHODE ISLAND, ASSIGNORS TO SPEIDEL CHAIN CO., OF PROVIDENCE, RHODE ISLAND, A FIRM COMPOSED OF FREDERIC SPEIDEL AND EUGEN SPEIDEL, BOTH OF PFORZHEIM, GERMANY

FLEXIBLE CHAIN

Application filed September 19, 1929. Serial No. 393,701.

Our present invention relates to the jewelry art, and has particular reference to chain constructions suitable for use as flexible bracelets or the like.

One object of the invention is to provide an extremely flexible chain of attractive appearance and sturdy construction.

Another object is to provide a flexible chain which utilizes a minimum number of parts designed for rapid machine production, and which simulates a chain formed of a multiplicity of parts.

An additional object is to form a chain which requires a minimum number of operations for assembly and for repair.

Other objects and advantageous features will be readily apparent from the detailed description following, in conjunction with the accompanying drawings and will be particularly pointed out in the appended claims.

Figures 4, 5, 6:
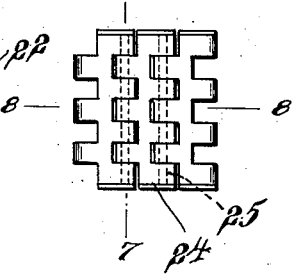
Figs. 4, 5 and 6 are details showing steps in the assembly of links to form a completed chain.
Figure 8:
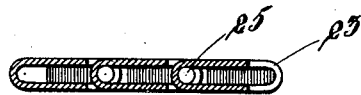
Figure 7:
Figure 10:
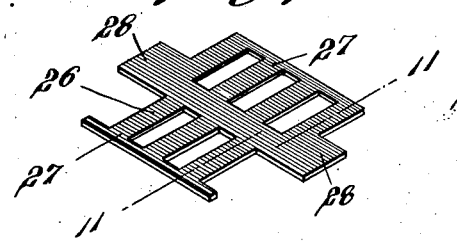
Figures 11, 12:
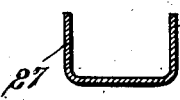
Figure 9:
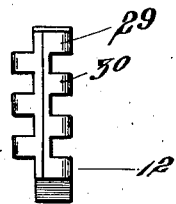

Figs. 7 and 8 are sections on the line 7—7 and 8—8 respectively of Figure 6;

Fig. 9 is a plan view of a chain link, ready for assembly, formed from sheet stock;

Fig. 10 is a perspective view of a sheet metal stamping for making the sheet stock link;

Fig. 11 is a section on the line 11—11 of Figure 10, the edges being shown folded upwardly preparatory to joining in abutting relation; and Fig. 12 is a section on the line 12—12 of Figure 9 showing the edges after joining.

The increasing production cost of forming flexible link bracelets and the like has rendered desirable a reduction in the number of parts required and in the number of operations necessary to produce a flexible bracelet of the link type. We have devised a simple construction which utilizes a minimum number of link parts hingedly connected together, and which requires a minimum number of manufacturing operations; the resulting chain is attractive, sturdy, and simulates the appearance and flexibility of a chain formed of a multiplicity of links; and the following is a detailed description of several chain constructions which embody the principles of our invention.

Figure 1:
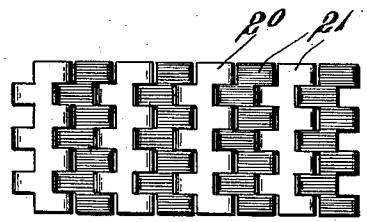
Fig. 1 is a plan view of the improved chain.
Figure 2:
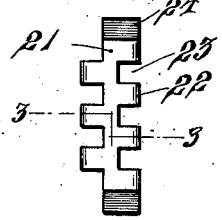
Fig. 2 is a plan view of a single chain link formed from tubular stock.
Figure 3:
Fig. 3 is a cross section on the line 3—3 of Figure 2.

Referring to the drawings, the completed chain is designated as 20 in Figure 1 and comprises a plurality of link units 21 hingedly connected together. Each link unit, as shown in Figures 2 and 3, is formed from tubular stock, slit at the edges to obtain a plurality of sections 22 extending from each side thereof with openings 23 therebetween, the sections on the respective sides being relatively staggered, end sections 24 being left at each end of the link to form closure members as hereinafter described.

One end section 24 of each link is folded upwardly as shown in Figure 4, to close and seal that end of the link, and the links are then connected by inserting side sections 22 of one link into openings 23 of an adjacent link to intermesh the contiguous side sections, then threading pins 25 through the contiguous side sections, and then folding the other end sections 24 upwardly to lock the pins 25 against longitudinal movement and thus complete the formation of the chain 20.

If desired, sheet stock may be used instead of tubular stock. Stampings 26, such as are shown in Figure 10, are made preferably by punch press operation, and the sides 27 are folded upwardly as shown in Figure 11 and then in abutting relation as shown in Figure 12; one end section 28 is then folded upwardly to close and seal the end of the formed tubular link 29, which as shown in Figure 9 has staggered side sections 30 and therefore corresponds exactly to the tubular link 21. The links 29 are then assembled as shown in Figures 4, 5 and 6.

Our improved flexible chain is formed of link sections which may be made from tubular stock or may be folded from a sheet metal stamping, and pins which join adjacent link sections together and are locked against longitudinal movement by the folding up of the link section ends. The improved chain construction therefore reduces the number of parts required to two, and also reduces the necessary production operations to a minimum.

While we have described specific structural embodiments of our invention, it is obvious that desired changes in form and in arrangement may be made without departing from the spirit of the invention as defined in the appended claims.

We claim:

1. A sheet metal stamping for a chain link comprising a body portion, spaced openings therein in staggered relation located inwardly from the periphery of the stamping, and an end section at each end thereof adapted to close the ends of said link when the sides are joined in abutting relation.

2. A flexible chain comprising a series of body links, each formed from sheet material folded to form a tube with a seam formed by edges abutting along the bottom thereof, a plurality of separated sections on the sides of each link joined by integral portions in the body of the link on the top and bottom thereof, two integral joining portions along the bottom abutting to form said seam, the contiguous side sections of adjacent links intermeshing and pins extending through the said contiguous side sections.

3. A flexible chain comprising a series of body links, each formed from sheet material folded to form a tube with a seam formed by edges abutting along the bottom thereof, a plurality of separated sections on the sides of each link joined by integral portions in the body of the link on the top and bottom thereof, two integral joining portions along the bottom abutting to form said seam the contiguous side sections of adjacent links intermeshing, pins extending through the said contiguous side sections and end sections on each link folded across the ends of said pins to prevent longitudinal movement of said pins.

In testimony whereof we affix our signatures.

KARL FASSNACHT.
RICHARD GLOSS.